US012656591B2

(12) United States Patent
Krainer

(10) Patent No.: US 12,656,591 B2
(45) Date of Patent: Jun. 16, 2026

(54) MULTIMODAL MICROSCOPIC SYSTEMS

(71) Applicant: Prospective Instruments GmbH, Regensdorf (CH)

(72) Inventor: Lukas Krainer, Dornbirn (AT)

(73) Assignee: Prospective Instruments GmbH, Regensdorf (CH)

( * ) Notice: Subject to any disclaimer, the term of this patent is extended or adjusted under 35 U.S.C. 154(b) by 595 days.

(21) Appl. No.: 18/006,988

(22) PCT Filed: Jul. 12, 2021

(86) PCT No.: PCT/EP2021/069249
§ 371 (c)(1),
(2) Date: Jan. 26, 2023

(87) PCT Pub. No.: WO2022/023001
PCT Pub. Date: Feb. 3, 2022

(65) Prior Publication Data
US 2023/0273421 A1 Aug. 31, 2023

(30) Foreign Application Priority Data
Jul. 28, 2020 (EP) .................................... 20188187

(51) Int. Cl.
*G02B 21/18* (2006.01)
*G01N 21/64* (2006.01)
(Continued)

(52) U.S. Cl.
CPC ......... *G02B 21/18* (2013.01); *G01N 21/6458* (2013.01); *G02B 21/16* (2013.01); *G02B 27/106* (2013.01)

(58) Field of Classification Search
CPC .......................... G02B 21/00; G02B 21/0016; G02B 21/0028; G02B 21/36; G02B 21/361;
(Continued)

(56) References Cited

U.S. PATENT DOCUMENTS 9,176,309 B2 11/2015 Koenig et al.
2011/0282166 A1 11/2011 Chen et al.
(Continued)

FOREIGN PATENT DOCUMENTS

EP 2 579 085 A1 4/2013
WO 2010/086861 A1 8/2010
(Continued)

OTHER PUBLICATIONS

B. Liu et al., "VIEW-MOD: a versatile illumination engine with a modular optical design for fluorescence microscopy", Optics Express, Vo. 27, No. 14, Jul. 3, 2019 pp. 19950, See European Search See International Search.
(Continued)

*Primary Examiner* — Jie Lei
(74) *Attorney, Agent, or Firm* — Secant IP, P.L.L.C.

(57) ABSTRACT

Disclosed are multimodal microscopic systems (1). In a first aspect, the system (1) comprises at least a first base unit (2) comprising at least one electrical and/or optical base component (14, 15, 16, 17, 18, 19), at least one scan unit (4) comprising at least one scan component (20, 21, 22) and at least one detection unit (5) comprising at least one detection component (7, 8, 9, 10, 11). The at least one base component (14, 15, 16, 17, 18, 19), the at least one scan component (20, 21, 22) and the at least one detection component (7, 8, 9, 10, 11) are operatively coupled to each other such that at least one base components (14, 15, 16, 17, 18, 19) and/or at least one scan components (20, 21, 22) and/or at least one detection components (7, 8, 9, 10, 11) is jointly useable for more than one modality. In further aspects, the system (1) comprises a beam combiner (26) which is arranged to superimpose the electromagnetic waves emitted by the electromagnetic wave sources (14, 15, 16, 17, 18, 19) and/or a beam splitter (27) which is arranged to split the electromag-
(Continued)

Figure 1:
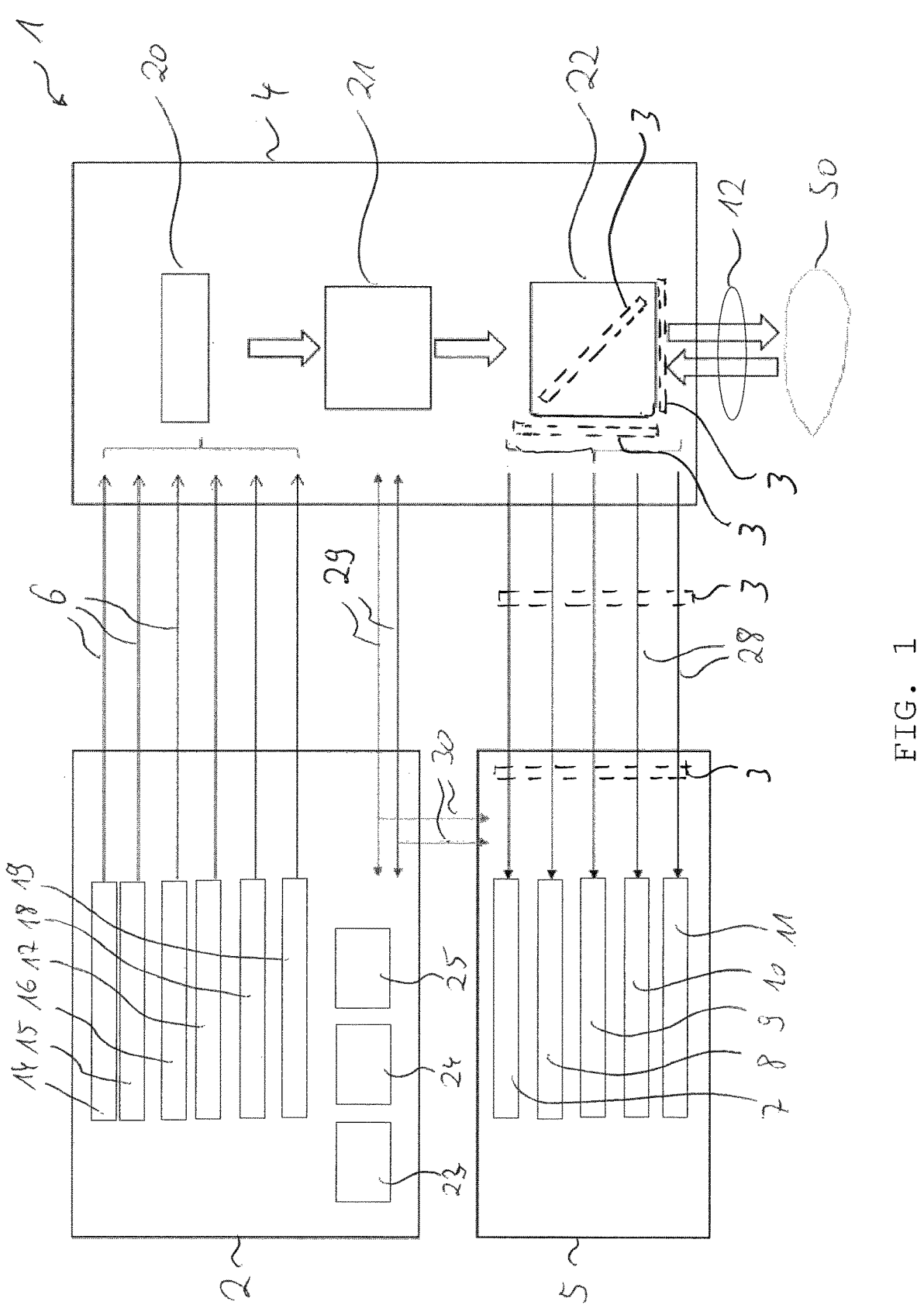

netic waves emitted by a probe (50) into a plurality of partial electromagnetic waves.

17 Claims, 2 Drawing Sheets

(51) Int. Cl.
G02B 21/16 (2006.01)
G02B 27/10 (2006.01)

(58) Field of Classification Search
CPC .. G02B 21/368; G02B 21/365; G02B 21/367;
G02B 21/18; G02B 21/16; G02B 21/26;
G02B 27/10; G02B 27/106; A61B 5/00;
A61B 5/0066; A61B 5/0071; A61B
5/0075; A61B 90/30; A61B 2090/371;
A61B 2090/3614; A61B 2090/3618;
G01N 21/64; G01N 21/6458
USPC ....... 359/368, 363, 382, 375, 383, 385, 390,
359/656, 802, 826
See application file for complete search history.

(56) References Cited

U.S. PATENT DOCUMENTS

| | | | |
|---|---|---|---|
| 2013/0088709 A1 | 4/2013 | Koenig et al. | |
| 2016/0209270 A1 | 7/2016 | Seyfried et al. | |
| 2022/0015638 A1* | 1/2022 | Zeng | ................. G02B 21/0048 |

FOREIGN PATENT DOCUMENTS

| | | | |
|---|---|---|---|
| WO | 2011/150431 A1 | 12/2011 | |
| WO | 2012/135961 A1 | 10/2012 | |
| WO | 2019/180187 A1 | 9/2019 | |
| WO | 2020/102912 A1 | 5/2020 | |

OTHER PUBLICATIONS

European Search Report Corresponding to EP20188187 mailed Jan. 20, 2021.
International Search Report Corresponding to PCT/EP2021/069249 mailed Oct. 25, 2021.
Written Opinion Corresponding to PCT/EP2021/069249 mailed Oct. 25, 2021.
Japanese Office Action Corresponding to 2023-506260 mailed Jan. 28, 2025.

* cited by examiner

MULTIMODAL MICROSCOPIC SYSTEMS

The present application relates to multimodal microscopic systems. It is known in the art to provide optical images from multiple optical imaging modalities and to combine these images. Systems having this ability are called multimodal microscopic systems. They may be used, for example, in medicine, in particular in the imaging of tissue.

One known multimodal system is disclosed, for example, in WO 2010/086861 A1. This system comprises an Optical Coherent Tomography (OCT) module, a photoacoustic (PA) module, an optical switcher and an endoscopic head, wherein the PA light source and the OCT light source are coupled to the endoscopic head through the optical switcher. This system has several disadvantages. In particular, it allows only a sequential or pseudo-parallel imaging. Therefore, the processing times of the different modalities add up so that the frame rate at which the images can be displayed or further evaluated decreases. In addition, processes cannot be visualized with different modalities simultaneously. Moreover, the mentioned switchers are expensive.

Furthermore, WO 2011/150431 A1 discloses multimodal methods and systems for imaging tissue. The system comprises at least one excitation light source, an optical and alignment system, a detector, a spectral filtering or dispersing device for providing at least two imaging modalities at the detector, and a processor for constructing a dual mode image.

Moreover, EP 2 579 085 A1 discloses a laser scanning microscope comprising a measuring head connected with a radiation source, and an adjustable mirror for deflecting and aligning an excitation beam of pulsed laser radiation of the source. A beam splitter is arranged in front of a focusing lens. A photodetector determines a radiation position of the beam. A control unit controls the mirror based on a determined deviation of a test beam from a middle alignment such that a direction stabilization of the beam is reached independent of the measure of position-conditioned impairment of a transmission lens. The beam splitter is designed as a reflection beam splitter or a transmission beam splitter.

In addition, US 2013/0088709 A1 discloses a nonlinear laser scanning microscope for flexible, noninvasive three-dimensional detection comprising a measuring head which is flexibly connected to at least one radiation source by transmission optics and can be freely positioned in space. At least one controllable tilt mirror is arranged for aligning the excitation beam in order to keep the excitation beam concentric to an aperture-limited optical element of the measuring head. A test beam is coupled out of the excitation beam onto a spatially resolving photodetector for monitoring the center alignment of the test beam as a conjugate position to the target position of the excitation beam and directional stabilizing the excitation beam by a control unit of the tilt mirror depending on a determined deviation.

It is an object of the present application to provide an improved multimodal microscopic system in which the disadvantages of the prior art are removed or at least reduced. In particular, the system should allow shorter processing times of the different modalities and the frame rate at which the images can be displayed or further evaluated should decrease.

In a first aspect, the invention relates to a multimodal microscopic system comprising at least one first base unit comprising at least one electrical and/or optical base component, at least one scan unit comprising at least one scan component and at least one detection unit comprising at least one detection component. Preferably, the at least one first base unit comprises at least two electrical and/or optical base components and/or the at least one scan unit comprises at least two scan components and/or the at least one detection unit comprises at least two detection component.

The scan unit and/or the detection unit is preferably freely movable, in particular with six degrees of freedom. The scan unit and/or the detection unit is connected to the first base unit via at least one flexible connecting line, in particular at least one optical connecting line and/or at least one electric connecting line.

According to a first aspect of the invention, the at least one base component, the at least one scan component and the at least one detection component are operatively coupled to each other such that at least one base component and/or at least one scan component and/or at least one detection component is jointly and in particular simultaneously useable for more than one modality.

In other words, two components of the three units (base unit, scan unit, detection unit) can be used in conjunction with one and the same component or one and the same set of components of one the remaining units in order to provide different modalities.

Thus, in a first embodiment, the first base unit may contain a first base component and a second base component, wherein the first base component can be used in connection with a scan component or a set of scan components for providing a first modality, and wherein the second base component can be used in connection with the same scan component or the same set of scan components for providing a second modality. In a second embodiment, the first base unit may contain a first base component and a second base component, wherein the first base component can be used in connection with a detection component or a set of detection components for providing a first modality, and wherein the second base component can be used in connection with the same detection component or the same set of detection components for providing a second modality.

In a further embodiment, the first scan unit may contain a first scan component and a second scan component, wherein the first scan component can be used in connection with a detection component or a set of detection components for providing a first modality, and wherein the second scan component can be used in connection with the same detection component or the same set of detection components for providing a second modality. In still a further embodiment, the first scan unit may contain a first scan component and a second scan component, wherein the first scan component can be used in connection with a base component or a set of base components for providing a first modality, and wherein the second scan component can be used in connection with the same base component or the same set of base components for providing a second modality.

In yet a further embodiment, the first detection unit may contain a first detection component and a second detection component, wherein the first detection component can be used in connection with a base component or a set of base components for providing a first modality, and wherein the second detection component can be used in connection with the same base component or the same set of base components for providing a second modality. In still another embodiment, the first detection unit may contain a first detection component and a second detection component, wherein the first detection component can be used in connection with a scan component or a set of scan components for providing a first modality, and wherein the second detection component can be used in connection with the same scan component or the same set of scan components for providing a second modality.

As will be apparent from the following discussion, the joint usability of a component of the system for more than one modality reduces the number of components and the size of the system. Furthermore, it allows the simultaneous imaging with different modalities in a truly parallel manner.

Advantageously, the base components are electromagnetic wave sources usable for different modalities. This provides images by different modalities which may be combined. The different modalities may be selected from the group consisting of two photon excitation fluorescence, two photon autofluorescence, fluorescence lifetime imaging, autofluorescence lifetime imaging, second harmonic generation, third harmonic generation, incoherent/spontaneous Raman scattering, coherent anti-stokes Raman scattering (CARS), broadband or multiplex CARS, stimulated Raman scattering, coherent Raman scattering, stimulated emission depletion (STED), nonlinear absorption, confocal Raman microscope, optical coherence tomography (OCT), single photon/linear fluorescence imaging, bright-field imaging, dark-field imaging, three-photon, four-photon, second harmonic generation, third harmonic generation, and fourth harmonic generation.

In particular, the electromagnetic wave sources can be selected from the group consisting of a pulsed laser source, a CW (continuous wave) coherent or incoherent light source, a narrow linewidth laser, a broadband laser source, a broadband incoherent laser source, a swept frequency laser source, an optical amplifier pump laser and a white light source. The laser source may comprise a laser amplifier and/or a frequency converter.

With preference, the first base unit comprises at least one, preferably one single, electromagnetic wave source, in particular a light source, which is used for at least two modalities. This reduces the number of self-contained units of the system as well as the installation space of the entire system.

Alternatively, at least a portion of the at least one electromagnetic wave source or the entire at least one electromagnetic wave source, in particular the only electromagnetic wave source of the system, may be contained in the scan unit. In the case of a laser source, a laser amplifier and/or a frequency converter of the laser source may be contained in the scan unit. The light source may be connected to the first base unit via at least one electrical cable and/or an optical fiber cable. Providing an electromagnetic light source and/or a laser amplifier and/or a frequency converter in the scan unit has the advantage that mirror arms as disclosed for example in US 2013/0088709 A1 can be dispensed with.

Furthermore, the detection unit may have at least one detection component selected from the group consisting of a photodetector, a single photon counter, an optical spectrometer, an optical power meter and a camera. In particular, the detection unit may comprise at least two different ones of the above mention detection components.

The detection unit may be (i) arranged in said first base unit or (ii) arranged in a second base unit different from the first base unit or (iii) associated with a respective scan unit. In this respect, the term "associated with" means that the detection unit is operatively connected with the respective scan unit, for example by at least one cable, or contained in a housing of the scan unit. At least some of the mentioned alternatives have the advantage that the number of self-contained units of the system as well as the installation space of the entire system are reduced.

The arrangement of the components within the different units may be chosen in accordance with the specific requirements of a certain application, for example the number of different modalities, the number of light sources, the number of scan components and the number of detection components as well as limitations on the overall sizes of the base unit, the scan unit and the detection unit. For example, a laser source may be arranged in the base unit and a laser amplifier may be arranged in the scan unit. However, when a specific application requires a small scan unit, the laser amplifier may be arranged in the base unit as well.

With further preference, at least one of the scan units comprises a scan component selected from the group consisting of a light amplifier, in particular a laser amplifier, transfer/scan optics and an excitation emission filter. Alternatively, one or more scan components may be contained in one of the base units, in particular the first base unit, or in one of the detection units. In an alternative embodiment, a laser amplifier may also be integrated in a connecting line between the base unit and the scan unit.

In addition, the scan unit may include at least one optical scan component. Here and below, an "optical scan component" is to be understood as an optical component of the scan unit which does not necessary contribute to the scanning process as such. For example, the scan unit may comprise at least one of an optical fiber coupling for directing analysis light to a probe, a galvanometer scanner, a microelectromechanical system (MEM) and a digital micromirror device (DMD).

Alternatively, white light may be emitted directly onto the probe, i.e. without any objective or optical fiber which is optically arranged between the light source and the probe. A modality using this white light does therefore not require any scan unit (with the proviso that, within the present invention, the system employs another modality which uses the scan unit).

With further preference, said optical scan component may be arranged in the scan unit in such a way that a signal emitted from the probe is transmitted back to the detection unit, in particular directly or through said objective or fiber coupling. This further reduces the number of self-contained units of the system.

Moreover, the filter mentioned above may be arranged such that a signal emitted from a probe is filtered by means of said filter.

In addition, the system may comprise a switching unit allowing to selectively transmit a signal emitted from a probe to one of the detection units depending on the chosen modality.

Further advantages arise when the first base unit comprises at least one of electronics, software, power supplies and optics, in particular a laser.

In a second aspect, the invention also relates to a multi-modal microscopic system, in particular a system as described above. The system according to the second aspect of the invention comprises at least a first base unit comprising a plurality of electromagnetic wave sources and at least one scan unit which is preferably freely movable, in particular with six degrees of freedom. The scan unit is connected to the first base unit via a flexible connecting line, in particular an optical connecting line (in particular an optical fiber) and/or an electric connecting line. According to the second aspect of the invention, the system comprises a beam combiner which is arranged to superimpose the electromagnetic waves emitted by the electromagnetic wave sources to provide a superimposed electromagnetic wave which is transmittable to the scan unit. Thus, in contrast to the system disclosed in WO 2010/086861 A1, an optical switcher is not necessary so that the different modalities can be processed simultaneously and the frame rate at which the images can be displayed or further evaluated decreases.

The inventive superimposition of electromagnetic waves may be achieved by appropriate optical coatings of optical components of the beam combiner. In particular, the coating of the optical components of said beam combiner may be chosen to provide for a predetermined transmission/reflection ratio within a specific range of wavelengths, for example in a range from 350 mm to 800 mm, in a range from 900 nm to 1350 nm or in a range from 1600 nm to 1900 nm. The transmission/reflection ratio in a specific range of wavelength may be in the range from 0.1:99.9 to 99.9:0.1, preferably from 10:90 to 90:10. This permits that the electromagnetic waves of a first modality are essentially transmitted and the electromagnetic waves of a second modality are essentially reflected, for example under a 90° angle, thus combining both electromagnetic waves from both modalities together in one single beam. Both modalities can operate with the same wavelengths in this particular scheme.

The power loss occurring in said coating can be compensated by increasing the power of the incoming electromagnetic waves, therefore compensating the coating characteristics. Often, the remaining power is sufficient for the intended application, so no increase in power is required. Alternatively, the coating of said optical component can be exactly matched to the electromagnetic wave characteristic of the chosen modality (in terms of wavelength or polarization) so that different modalities can be combined simultaneously in one beam without a power loss.

Other beam combiners like an optical diffraction grating can be foreseen where the different modalities with their different individual wavelengths can be combined through the different diffraction angles of the grating, therefore superimposing the resulting beam into a single beam.

Adding modalities via different electromagnetic wave polarization states of said modalities into a single beam via a polarizing optical element can also be achieved.

By adding more optical components with similar characteristics, more and more modalities can be combined in the same way.

Alternatively or in addition, the superimposition of electromagnetic waves may be achieved by appropriate filters and/or appropriate electronics.

In a third aspect, the invention also relates to a multimodal microscopic system, in particular one of the systems as described above. The system according to the third aspect of the invention comprises at least two detection units and a beam splitter which is arranged to split the electromagnetic waves emitted by a probe into a plurality of partial electromagnetic waves and to transmit the partial electromagnetic waves to respective detection units.

The inventive splitting of electromagnetic waves may be achieved by appropriate optical coatings of optical components of the beam splitter. In particular, the coating of the optical components of said beam splitter may be chosen to provide for a predetermined transmission/reflection ratio within a specific range of wavelengths, for example in a range from 350 mm to 800 mm, in a range from 900 nm to 1350 nm or in a range from 1600 nm to 1900 nm. The transmission/reflection ratio in a specific range of wavelength may be in the range from 0.1:99.9 to 99.9:0.1, preferably from 10:90 to 90:10. This permits that the electromagnetic waves of a first modality are essentially transmitted and the electromagnetic waves of a second modality are essentially reflected, for example under a 90° angle, thus splitting an electromagnetic wave containing two modalities into two beams. Both modalities can operate with the same wavelengths in this particular scheme.

Other beam splitters like an optical diffraction grating can be foreseen where the different modalities with their different individual wavelengths can be split through the different diffraction angles of the grating, therefore splitting a beam into several beams.

Splitting a beam comprising modalities with different electromagnetic wave polarization states into several beams via a polarizing optical element can also be achieved.

Alternatively or in addition, the splitting of electromagnetic waves may be achieved by appropriate filters, frequency converters and/or appropriate electronics.

The partial electromagnetic waves into which the electromagnetic waves are split by the beam splitter and/or which are combined by the beam combiner may be spatially separated from one another. Alternatively or additionally, the partial electromagnetic waves may have identical relative spectral power distributions, wherein a spectral power distribution is understood as the power per unit area per unit wavelength of the respective partial electromagnetic wave; for example, the spectral power distribution of a first partial electromagnetic wave may be a multiple of the spectral power distribution of a second partial electromagnetic wave. Also alternatively or additionally, the partial waves may have identical or different total intensities.

With preference, at least two of the detection units are adapted for the detection of different modalities, in particular two photon excitation fluorescence, two photon autofluorescence, fluorescence lifetime imaging, autofluorescence lifetime imaging, second harmonic generation, third harmonic generation, incoherent/spontaneous Raman scattering, coherent anti-stokes Raman scattering (CARS), broadband or multiplex CARS, stimulated Raman scattering, stimulated emission depletion (STED), nonlinear absorption, confocal Raman microscope, and optical coherence tomography (OCT), single photon/linear fluorescence imaging, bright-field imaging, dark-field imaging, three-photon, four-photon, second harmonic generation, third harmonic generation, and fourth harmonic generation.

For example, a first partial electromagnetic wave produced by the beam splitter can be transmitted to a first detection unit which is adapted for the detection of a first modality, whereas a second partial electromagnetic wave produced by the beam splitter can be transmitted to a second detection unit which is adapted for the detection of a second, different modality.

At least one base unit and/or at least one scan unit and/or at least one detection unit, in particular each of said units, may be accommodated in a separate housing. Moreover, at least one base unit and at least one scan unit may be accommodated in a common housing, and the detection unit may be accommodated in a separate housing; or at least one base unit and at least one detection unit may be accommodated in a common housing, and the scan unit may be accommodated in a separate housing; or at least one scan unit and at least one detection unit may be accommodated in a common housing, and the base unit may be accommodated in a separate housing. Alternatively, the at least one base unit and the at least one scan unit and the at least one detection unit may all be accommodated in one and the same housing.

Figure 2:
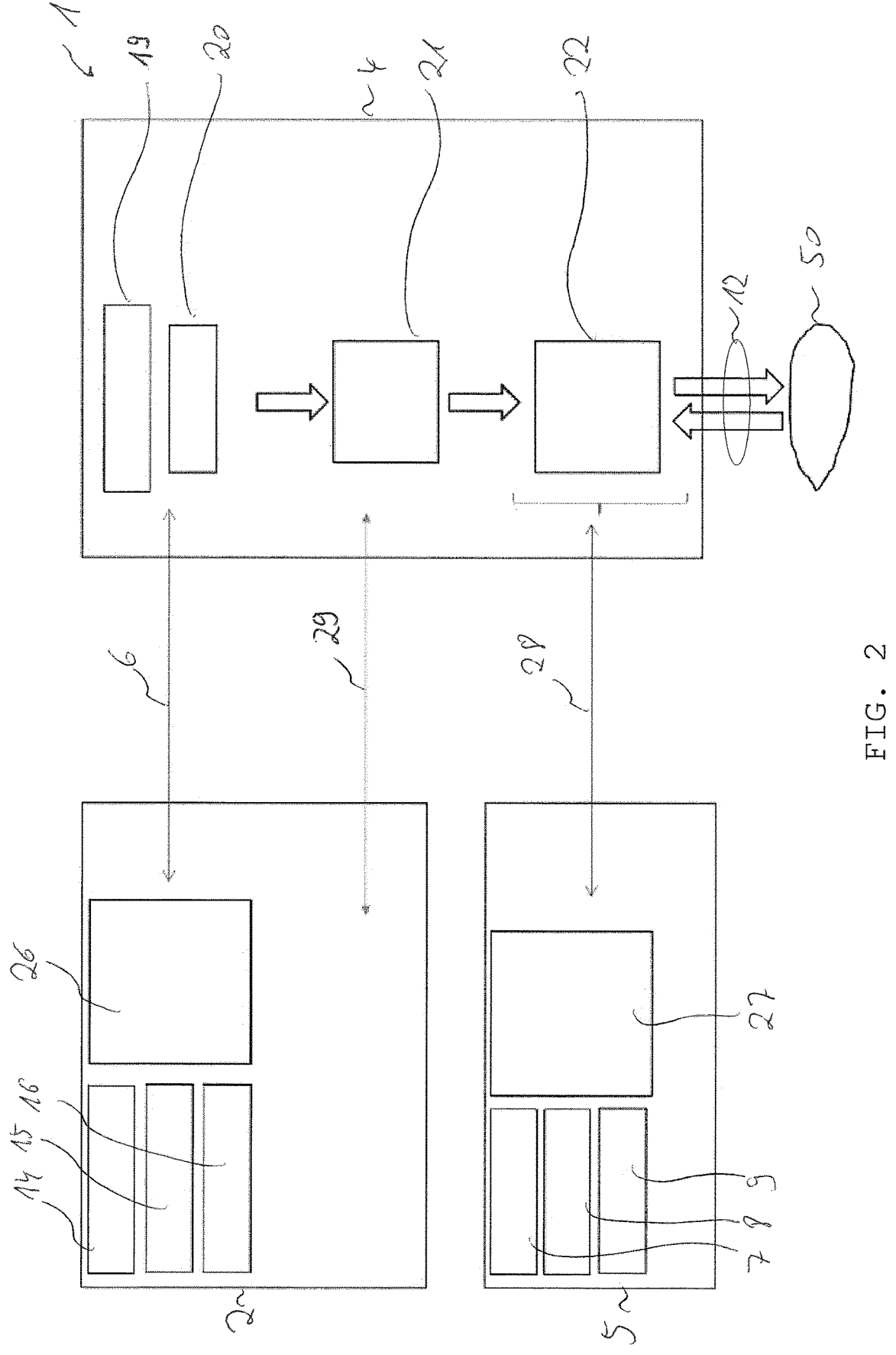

The invention and its advantages will be explained in more detail below with reference to two embodiments, which are illustrated in the following schematic drawings. In the drawings, FIG. 1: shows a first embodiment of a multimodal microscopic system according to the invention;

FIG. 2: shows a second embodiment of a multimodal microscopic system according to the invention.

The multimodal microscopic system 1 shown in FIG. 1 comprises a first base unit 2 (hereafter referred to as base unit 2), a scan unit 4 and a detection unit 5.

The base unit 2 contains several light sources for different modalities: a laser source 14, a light source 15 for fluorescence imaging, a laser 16 for Raman scattering, a light source 17 for Optical Coherent Tomography (OCT), an amplifier pump laser 18 and a white light source 19. The base unit 2 additionally comprises electronics 23, software 24 and power supplies 25.

The scan unit 4 contains several scan components: a light amplifier (in particular a laser amplifier) and/or frequency converter 20, transfer/scan optics 21 and an excitation emission filter 22. Each light source 14, 15, 16, 17, 18, 19 is connected to the scan unit 4 via a separate flexible connecting line 6, for example a fiber optic cable. Thus, each of the light sources 14, 15, 16, 17, 18, 19 is operatively connected to one and the same set of scan components 20, 21, 22 so that the different modalities associated with the light sources 14, 15, 16, 17, 18, 19 can be provided with this single set of scan components 20, 21, 22. Providing the laser amplifier and/or the frequency converter in the scan unit 4 has the advantage that mirror arms as disclosed for example in US 2013/0088709 A1 can be dispensed with.

The scan unit 4 further includes an objective 12 for directing analysis light to a probe 50. In more detail, the objective 12 is arranged in the scan unit 4 in such a way that a signal emitted from the probe is transmitted back through the objective 12. In an alternative embodiment, the objective 12 may be replaced by fiber optics. The filter 22 is arranged such that the signal emitted from the probe 50 is filtered by means of said filter 22. The scan unit 4 is also connected to the base unit 2 via electrical cables 29 which supply the scan unit 4 with power and which control the scan unit 4.

The detection unit 5 is operatively connected with the scan unit 4 and contains several detection components: a photodetector 7, a single photon counter 8, an optical spectrometer 9, an optical power meter 10 and a fluorescence camera 11. Both the scan unit 4 and the detection unit 5 are freely movable in six degrees of freedom. Each detection component 7, 8, 9, 10, 11 is connected to the scan unit 4 via a separate flexible connecting line 28, for example a fiber optic cable. Thus, each detection component 7, 8, 9, 10, 11 is operatively connected to one and the same set of scan components 20, 21, 22 so that the different modalities associated with the detection components 7, 8, 9, 10, 11 can be provided with this single set of scan components 20, 21, 22. Alternatively, the light emitted from light source 17 may be emitted directly onto the probe 50. The detection unit 5 is also connected to the base unit 2 via electrical cables 30 which supply the detection unit 5 with power and which control the detection unit 5. Alternatively, the detection unit 5 may by supplied with power from a different source and/or controlled in a wireless manner, for example by an app.

The system 1 further comprises a switching unit 3 allowing to selectively transmit the signal emitted from the probe 50 to the detection unit 5 depending on the chosen modality. FIG. 1 shows several positions in which the switching unit 3 may be arranged: inside the excitation emission filter 22, inside the scan unit 4 between the excitation emission filter 22, inside the scan unit 4 between the excitation emission filter 22 and the detection unit 5, between the scan unit 4 and the detection unit 5, or inside the detection unit 5 between the scan unit 4 and the detection components 7, 8, 9, 10, 11.

The second multimodal microscopic system 1 shown in FIG. 2 comprises a beam combiner 26 which is arranged to superimpose the electromagnetic waves emitted by the electromagnetic wave sources 14, 15, 16 to provide a superimposed electromagnetic wave which is transmittable to the scan unit 4 via a common optical fiber 6.

The system 1 shown in FIG. 2 further comprises a beam splitter 27 which is arranged to split the electromagnetic waves emitted by the probe 50 into a plurality of partial electromagnetic waves and to transmit the partial electromagnetic waves to respective detection units 4. In addition to a spatial splitting, the partial electromagnetic waves may also be split according to their wavelengths. At least two of the detections units 4 are adapted for the detection of different modalities.

The invention claimed is:

1. A multimodal microscopic system comprising:
   at least one first base unit comprising at least one electrical and/or optical base component;
   at least one scan unit comprising at least one scan component; and
   at least one detection unit comprising at least one detection component,
   wherein
   at least one component selected from the group comprising the scan unit and the detection unit is connected to the first base unit,
   wherein the at least one base component, the at least one scan component and the at least one detection component are operatively coupled to each other such that at least one component selected from the group comprising
   at least one base component,
   at least one scan component, and
   at least one detection component
   is jointly useable for more than one modality, wherein a laser source is arranged in the base unit and, wherein at least one of a laser amplifier and a frequency converter is contained in the scan unit,
   wherein the first base unit comprises at least two base components which are electromagnetic wave sources and usable for different modalities.

2. The system according to claim 1, wherein the at least one first base unit comprises at least two electrical and/or optical base components.

3. The system according to claim 1, wherein the at least one scan unit comprises at least two scan components.

4. The system according to claim 1, wherein the at least one detection unit comprises at least two detection components.

5. The system according to claim 1, wherein the scan unit and/or the detection unit is freely movable.

6. The system according to claim 1, wherein the scan unit and/or the detection unit is connected to the first base unit via at least one flexible connecting line.

7. The system according to claim 1, wherein the first base unit comprises at least one electromagnetic wave source which is used for at least two modalities.

8. The system according to claim 1, wherein at least a portion of the at least one electromagnetic wave source is contained in the scan unit.

9. The system according to claim 1, wherein the detection unit has at least one detection component selected from the group consisting of a photodetector, a single photon counter, an optical spectrometer, an optical power meter and a camera.

10. The system according to claim 1, wherein the detection unit is arranged in said first base unit or arranged in a second base unit different from the first base unit or associated with a respective scan unit.

11. The system according to claim 1, wherein the scan unit includes optical scan components such as an objective or an optical fiber coupling for directing analysis light to a probe.

12. The system according to claim 11, whereby the optical scan component is arranged in the scan unit in such a way that a signal emitted from the probe is transmitted back to the detection unit.

13. The system according to claim 1, wherein at least one of said scan units comprises an excitation emission filter which is arranged such that a signal emitted from a probe is filtered by means of said filter.

14. The system according to claim 1, further comprising a switching unit to selectively transmit a signal emitted from a probe to one of the detection units depending on the chosen modality.

15. The system according to claim 1, wherein the first base unit comprises at least one of electronics, software and power supplies.

16. A multimodal microscopic system comprising:
at least one first base unit comprising at least one electrical and/or optical base component;
at least one scan unit comprising at least a first scan component and a second scan component; and
at least one detection unit comprising at least one detection component,
wherein
at least one component selected from the group comprising the scan unit and the detection unit is connected to the first base unit,
wherein the at least one base component, the at least one scan component and the at least one detection component are operatively coupled to each other such that at least one component selected from the group comprising of
at least one base component,
at least one scan component, and
at least one detection component
is jointly useable for more than one modality, wherein the first scan component is configured to be used in connection with at least one detection component for providing a first imaging modality and the second scan component is configured to be used in connection with the same at least one detection component for providing a second imaging modality.

17. A multimodal microscopic system comprising:
at least one first base unit comprising at least one electrical and/or optical base component;
at least one scan unit comprising at least one scan component; and
at least one detection unit comprising at least one detection component,
wherein
at least one component selected from the group comprising the scan unit and the detection unit is connected to the first base unit,
wherein the at least one base component, the at least one scan component and the at least one detection component are operatively coupled to each other such that at least one component selected from the group comprising of
at least one base component,
at least one scan component, and
at least one detection component
is jointly useable for more than one modality, wherein an electromagnetic light source and at least one of a laser amplifier and a frequency converter are arranged in the scan unit.

* * * * *